(12) United States Patent
Bogani

(10) Patent No.: US 9,125,523 B2
(45) Date of Patent: Sep. 8, 2015

(54) RELEASABLE CONNECTION BETWEEN A HANDLE AND A PAN, AND A PAN WITH SAID CONNECTION

(75) Inventor: Giuseppe Bogani, Rovellasca (IT)

(73) Assignee: GBB SRL (IT)

( * ) Notice: Subject to any disclaimer, the term of this patent is extended or adjusted under 35 U.S.C. 154(b) by 0 days.

(21) Appl. No.: 14/117,602

(22) PCT Filed: Aug. 23, 2011

(86) PCT No.: PCT/IB2011/053690
§ 371 (c)(1),
(2), (4) Date: Nov. 13, 2013

(87) PCT Pub. No.: WO2012/156787
PCT Pub. Date: Nov. 22, 2012

(65) Prior Publication Data
US 2014/0076911 A1    Mar. 20, 2014

(30) Foreign Application Priority Data
May 13, 2011   (IT) .............................. MI2011A0841

(51) Int. Cl.
A47J 27/00    (2006.01)
A47J 36/00    (2006.01)
A47J 45/07    (2006.01)
A47J 37/10    (2006.01)

(52) U.S. Cl.
CPC *A47J 45/07* (2013.01); *A47J 37/10* (2013.01); *A47J 45/071* (2013.01)

(58) Field of Classification Search
USPC .................. 220/759, 573.1, 770, 762; 16/425
See application file for complete search history.

(56) References Cited

U.S. PATENT DOCUMENTS

| 1,268,089 | A | * | 6/1918 | Borsse | 220/759 |
| 1,818,284 | A | * | 8/1931 | Stephens | 220/759 |
| 3,934,748 | A | * | 1/1976 | Racz | 99/447 |
| 5,511,467 | A |   | 4/1996 | Motley et al. | |
| 6,260,733 | B1 | * | 7/2001 | Eimerman | 220/759 |

FOREIGN PATENT DOCUMENTS

| DE | 202009017496 | * | 3/2011 |
| EP | 1121041 |   | 8/2001 |
| EP | 2173225 |   | 12/2010 |

\* cited by examiner

*Primary Examiner* — Jeffrey Allen
*Assistant Examiner* — Jennifer Castriotta
(74) *Attorney, Agent, or Firm* — Frank J. Dykas; Dykas Law Offices

(57) ABSTRACT

A releasable connection between a pan and a handle comprises a bracket, which is provided with a hole and intended to project laterally from the body of the pan, and an engaging mechanism, which is intended to be arranged on the handle and which comprises an engaging tooth which is inserted into said hole and a cam element which is rotatable into a locked position for pushing with a first cam surface against a corresponding edge of the said hole so as to clamp a part of the bracket between the first said cam surface and a facing projecting part of the engaging mechanism. A strip allowing sliding of the cam and pressing against the edge of the hole is arranged between the said first cam surface and the corresponding edge of the hole. Advantageously the bracket may be made as one piece with an aluminum pan.

10 Claims, 2 Drawing Sheets

RELEASABLE CONNECTION BETWEEN A HANDLE AND A PAN, AND A PAN WITH SAID CONNECTION

CLAIM OF PRIORITY

This application claims the priority of International Application No. PCT/IB2011/053690 filed Aug. 23, 2011, which itself claims priority to MI2011A000841 filed May 13, 2011

BACKGROUND OF THE INVENTION (1) Field of Invention

The present invention relates to a removable handle for pans and to a pan with such a handle made of relatively soft material, as well as to a detachable connection with improved strength between a handle and a pan.

(2) Description of Related Art

In the art detachable connections between a handle and pan are known. An example of such a type of connection is illustrated in EP 1,121,041. Such a connection makes use of the reaction between two opposite surfaces of a rotating cam in order to achieve firm fixing of the handle once the connection is completed. This system necessarily requires very small tolerances in order to prevent the presence of play which would result in a not entirely rigid connection, thus giving the user the impression of a certain instability. Owing to the need for a very small amount of play, manufacture of the connection is relatively costly and each connection performed may require final adjustment.

EP 2,173,225 proposes providing a resilient part against which the cam reacts. In this way a stable play-free connection is ensured as a result of the elasticity of the fixing system.

One drawback which remains in the known rotating-cam systems is that, during rotation, the cam present on the handle slides against the reaction surface which is formed on a bracket projecting from the pan. If the cam and the bracket are not made of metal with the same hardness, this sliding action in the long run will damage one of the two surfaces. This results in both a weakening in the rigidity of the connection and partially engaged parts which make it difficult to insert and release the handle. For obvious strength-related reasons, usually the cam is made of a hard metal, such as steel, and the bracket must therefore be likewise made of a metal which is equally hard. The bracket is therefore usually made of suitable material and then fixed to the pan so as not to condition the choice of material used for the pan.

However, it would often be preferable to avoid using a separate bracket or also manufacture the bracket with the possibility for a wider choice of materials. For the abovementioned reasons, this is not always possible with cam-type locking systems and therefore often use of the removable handle is dispensed with. For example, in the case of aluminium pans, with the known systems it is not possible to manufacture a single-piece pan having an engaging seat for the removable handle.

The general object of the present invention is to overcome the abovementioned drawbacks by providing a detachable connection which ensures a solid and reliable joint, with a pleasing sense of solidity for the user, without any constraints as regards the resistance of the engaging seat to rotation of the locking cam.

SUMMARY OF THE INVENTION

In view of this object the idea which has occurred according to the invention is to provide a releasable connection between a pan and a handle, comprising a bracket, which is provided with a hole and intended to project laterally from the body of the pan, and an engaging mechanism, which is intended to be arranged on the handle and comprises an engaging tooth which is inserted into said hole and a cam element which is rotatable into a locked position for pushing with a first cam surface against a corresponding edge of the said hole so as to clamp a part of the bracket between the said first cam surface and a facing projecting part of the engaging mechanism, characterized in that a strip allowing sliding of the cam and pressing against the edge of the hole is arranged between the said first cam surface and the corresponding edge of the hole. In order to illustrate more clearly the innovative principles of the present invention and its advantages compared to the prior art a possible example of embodiment applying these principles will be described below, with the aid of the accompanying drawings.

DETAILED DESCRIPTION OF THE PREFERRED EMBODIMENT

Figure 1:
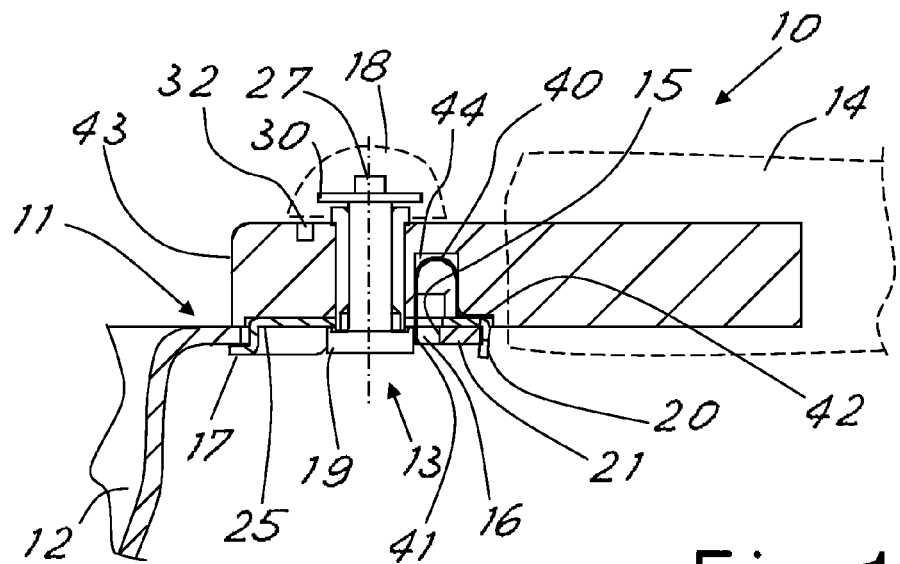
FIG. 1 shows a partial longitudinal section through a pan provided with a handle connection mechanism designed according to the invention, in a first released position.

With reference to the figures, a connection, denoted generically by 10 and designed according to the invention, comprises a first part or bracket 11, projecting laterally from the body of the pan 12, and a second part or engaging mechanism 13, which is fixed to a handle 14. The pan and handle may have any known shape and will not be further illustrated nor described in detail.

The bracket 11 has an engaging hole 16 for receiving a tooth or edge 17 which projects at the front from a plate 25 (advantageously stamped and cut from sheet metal) of the second part 13 and which is offset downwards so as to be arranged on the bottom side of the bracket 11.

The mechanism 13 also comprises a cam element 19 which is rotationally operated by an operating part or lever 18 via a pin 27. Advantageously, the pin 27 is riveted onto a metal plate 30 onto which the operating part 18, made for example of plastic, is snap-engaged. A tooth 31 may form an end-of-travel stop for rotation inside a specially provided grooved seat 32.

The mechanism has a body 43 which supports the various parts. This body 43 and the handle 14 may be made as one piece from plastic or as two parts joined together.

The engaging mechanism 13 has on the plate 25 a rear projection 20 situated opposite the engaging tooth 17 and intended to form a stop for the end edge or zone 21 of the bracket 11.

Figure 2:
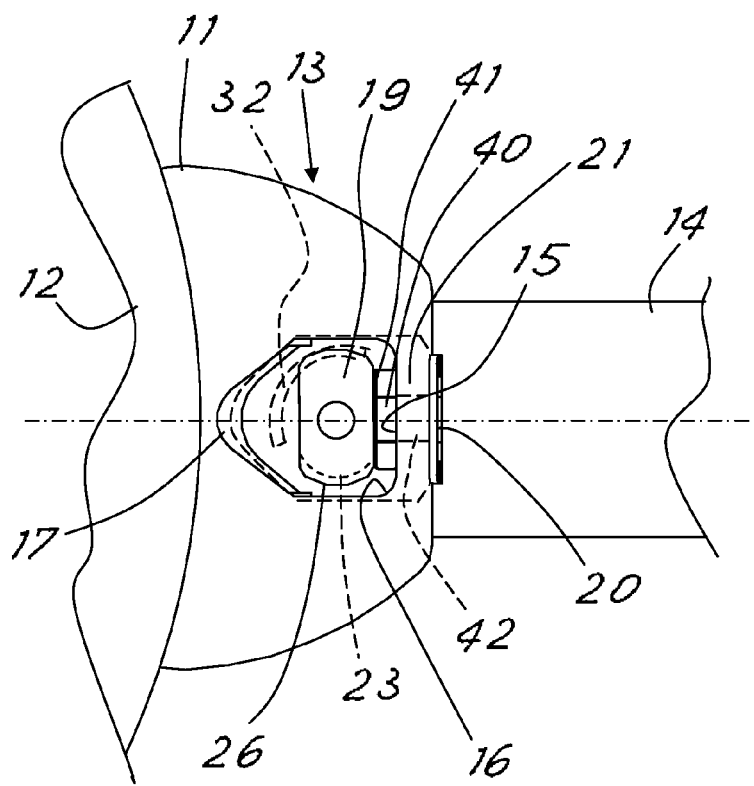
FIG. 2 shows a bottom view of the pan according to FIG. 1.
Figure 3:
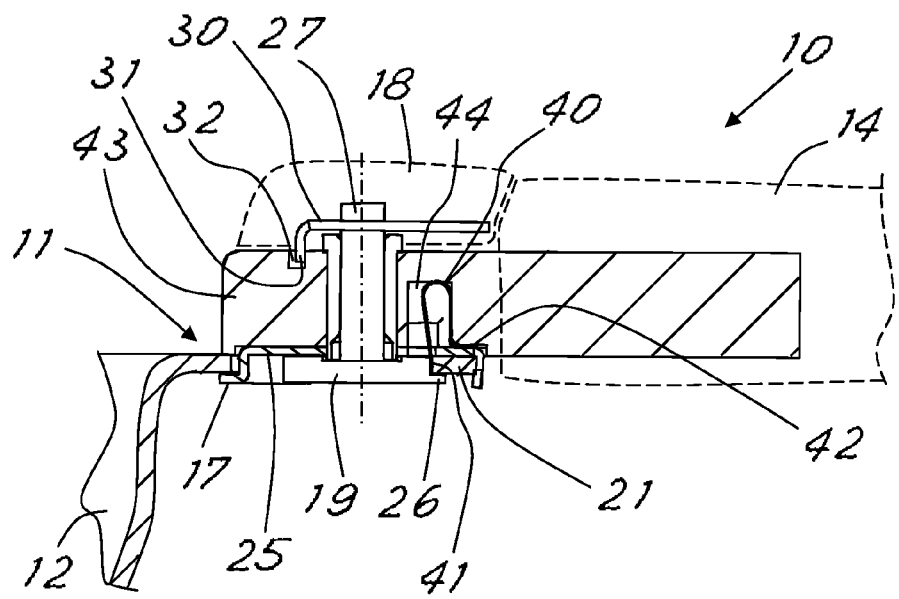
FIGS. 3 and 4 show views, similar to those of FIGS. 1 and 2, but with the connection mechanism in a locked position.
Figure 4:
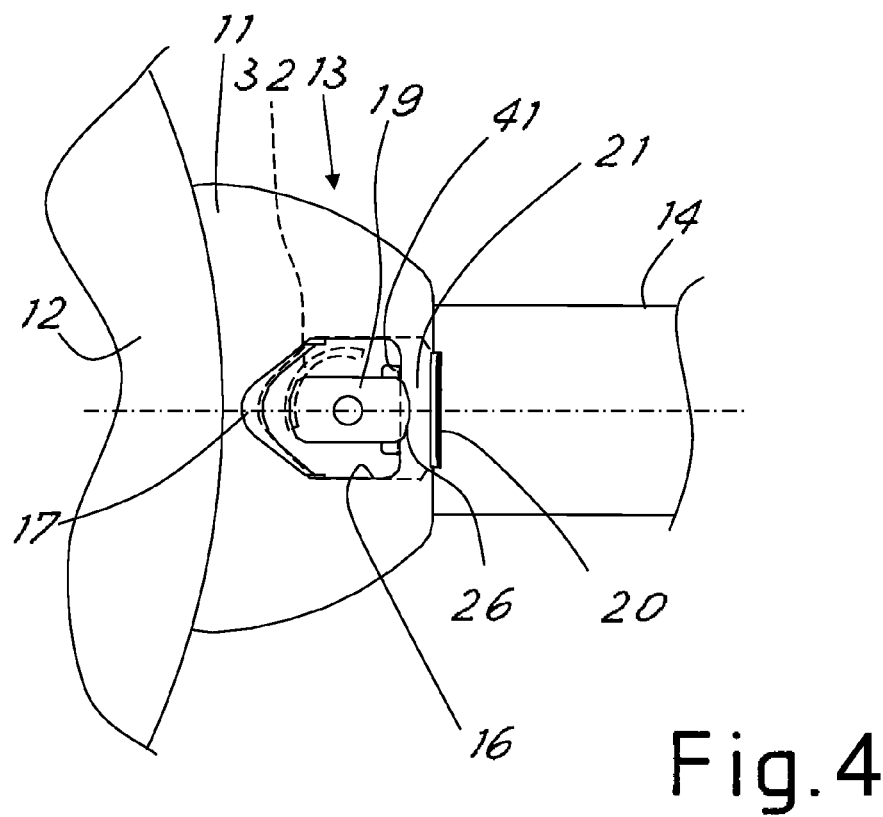

The cam comprises a first cam surface or active end 23 which is intended (as can be seen from a comparison of FIGS. 1, 2 and 3, 4) to push against the edge 15 of the hole opposite to the engaging edge of the tooth 17 when the cam is rotated into the locked position shown in FIGS. 3 and 4, so as to lock the engaging mechanism inside the bracket and form a solid connection between the handle and pan body.

On the active surface of the cam, the cam also has a projecting tooth 26 which in the locked position is engaged underneath the bracket 11 in the same manner as the front tooth 17. In this way extraction of the handle is prevented when the cam is in the locked position shown in FIGS. 3 and 4. When the cam is in the unlocked position shown in FIGS. 1 and 2, the handle may be inclined upwards relative to the bracket and the tooth 17 may be extracted from the hole 16, thus separating the handle from the pan body. The opposite movement re-engages the handle with the pan body.

As can be clearly seen also in FIG. 2, a strip 40, advantageously made of steel, allowing sliding of the cam operating surface and pressing against the edge 15 of the hole, is arranged between the first surface of the cam 23 and the corresponding edge 15 of the hole. This strip may be advantageously resilient (preferably made of spring steel) so as to be pushed resiliently by the cam against the edge of the hole when the cam is rotated into the locked position, as can be clearly seem from a comparison of FIGS. 1, 2 and 3, 4. In this way, the strip does not interfere with the releasing action and on the contrary is able to help keep the cam in the unlocked position until the moment when it must be operated.

As can be clearly seen in FIG. 1, advantageously, the resilient strip is generally U-shaped with an end 41 of one arm of the U which is free and which is arranged resiliently between the said first cam surface and the corresponding edge of the hole and the other arm of the U which has an end 42 fixed to the mechanism. In particular, this second end 42 is folded at an angle and is trapped between a surface of the support body 43 of the mechanism and the plate 25. The U-shaped strip is advantageously housed in a seat 44 formed in the body 43.

Owing to the presence of the strip, the forces which act on the seat or hole 16 in the bracket in order to lock the handle when the cam is rotated are only pushing and not sliding forces, since sliding of the cam is performed solely on the strip which is made of material suitable for opposing sliding with minimum friction. There is therefore nor risk of wear of the bracket material due to repeated operation of the locking system.

The bracket may thus be made of the material which is considered to be most advantageous, without having to have a hardness comparable to that of the material of the cam. For example, the bracket may be advantageously made of aluminium.

Even more advantageously, owing to the structure described, it is possible to provide a pan with a removable handle, comprising between the handle 14 and the pan body 12 the releasable connection as described here and with the bracket 11 of the connection which is formed as one piece with the pan body. It is thus advantageously possible to provide a pan with the bracket 11 and the pan body 12 made of aluminium, without the risk that repeated operation of the locking cam will wear the connection seat, loosen the joint and in the long run cause seizing and hinder engagement/disengagement.

According to the solution adopted it is not required to modify the general structure of the connection and, as a further way of ensuring a precise connection, a resilient reaction surface may be advantageously used, as can be clearly seen again from the figures.

According to this advantageous variation of embodiment, the distance between the active end 23 of the cam element (when the cam is in the locked position shown in FIGS. 3 and 4) and the projecting rear part 20 of the element 25 is advantageously slightly smaller than the width of the bracket part 21 which must be clamped between cam and projecting part 20. The projecting part 20 is made resiliently yielding so as to be suitably deviated during rotation of the cam into the locking or clamping position. The yielding resilience is chosen so as to allow manual rotation of the cam, but at the same time prevent play between handle and pan during normal use of the pan.

The flexibility of the part 20 may be achieved in various ways. For example, it is possible to provide a portion thinner than the rest of the plate 25 or a transverse or longitudinal undercut or incision in the part 20, or else this part may be made of a different material (for example spring steel) which is resiliently yielding with respect to the plate 25. The part 20 may also be made by cutting from the plate two tongues which are spaced transversely with respect to the handle and are relatively thin.

At this point it is clear how the predefined objects have been achieved. In the unlocked position, the handle can be easily engaged with or disengaged from the pan, while simple rotation of the lever 18 into the locked position ensures a stable connection without sliding of the cam affecting the engaging bracket. The strip prevents seizing and with its resilient movement may also help ensure precise bistable operation of the cam, preventing uncontrolled oscillating rotation of the cam and the operating lever when the handle is not mounted on the bracket.

The pan which is made as one piece according to the principles of the invention, instead of having a mounted bracket, is less costly, aesthetically more pleasing and does not have parts, such as rivets, for fixing the bracket which may with time slacken, as may happen in the prior art. Moreover the pan can be made entirely of aluminium, with all the advantages which are well known to the person skilled in the art. The bracket may be advantageously formed as an outward fold of at least one portion of the edge of the pan, in a simple and low-cost manner, as is schematically shown in the figures. This also results in less dependence on the conventional design of pans with a mounted bracket.

Obviously, the above description of an embodiment applying the innovative principles of the present invention is provided by way of example of these innovative principles and must therefore not be regarded as limiting the scope of the rights claimed herein. For example, the shape and size of the various parts may obviously vary depending on the specific requirements. The handle itself may have any shape and not necessarily have a long form; likewise the pan and its edge with the bracket may assume a variety of forms. The resilience of the strip may also be obtained by means of a rigid strip which is pivotably mounted on the mechanism and pressed by a suitable spring against the cam surface, as can be easily imagined by the person skilled in the art. Although the solution according to the present invention has been found to be particularly advantageous in the case of aluminium pans, other materials such as steel, iron, etc., may be used.

The invention claimed is:

1. A releasable connection between a pan and a handle, comprising a bracket, which is provided with a hole and configured to project laterally from the body of the pan, and an engaging mechanism, which is configured to be arranged on the handle and which comprises an engaging tooth configured to be inserted into said hole and a cam element configured to be rotatable into a locked position for pushing with a first cam surface against a corresponding edge of said hole so as to clamp a part of the bracket between the first cam surface and a facing projecting part of the engaging mechanism, characterized in that a resilient strip, configured to be pushed by the cam towards the edge of the hole against the resilient action and is generally U-shaped with an end of one arm of the U which is free and which is arranged resiliently between the said first cam surface and the corresponding edge of the hole and the other arm of the U which has an end fixed to the mechanism.

2. The connection according to claim 1, characterized in that the resilient strip is made of steel.

3. The connection according to claim 1, characterized in that said bracket is made of aluminum.

4. The connection according to claim 1, characterized in that the cam element has a step underneath the first cam surface which is configured such that in the locked position it is arranged underneath the bracket part against which the first cam surface presses via the resilient strip.

5. The connection according to claim 1, characterized in that the cam element is connected by means of a pin to a rotating part configured to be arranged visibly on top of the handle.

6. The connection according to claim 1, characterized in that the engaging mechanism comprises a cut and folded sheet-metal plate with a front part which forms the engaging tooth and rear part which forms said projecting part.

7. The connection according to claim 1, characterized in that the distance between the cam surface and the projecting part in the locked position is smaller than the breadth of the part of the bracket which must be clamped with the cam; further, the projecting part is made resiliently yielding so as to allow the cam to rotate into the locked position.

8. A pan with a removable handle, comprising the releasable connection between handle and pan according to claim 1, characterized in that the bracket of the connection is formed as one piece with the pan body.

9. The pan according to claim 8, characterized in that the bracket and the pan body are made of aluminium.

10. The pan according to claim 8, characterized in that the bracket is formed as an outward fold of at least one portion of the edge of the pan.

\* \* \* \* \*